United States Patent
Bastien et al.

(10) Patent No.: US 11,589,685 B2
(45) Date of Patent: Feb. 28, 2023

(54) PLAY YARD

(71) Applicant: MONAHAN PRODUCTS, LLC, Rockland, MA (US)

(72) Inventors: Richard M. Bastien, Cumberland, RI (US); Alex Richard Zadrozny, Pembroke, MA (US); Julianne Marie Depardieu, Braintree, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 388 days.

(21) Appl. No.: 16/862,036

(22) Filed: Apr. 29, 2020

(65) Prior Publication Data
US 2021/0337983 A1  Nov. 4, 2021

(51) Int. Cl.
*A47D 13/06* (2006.01)
*E05D 11/10* (2006.01)
*F16B 12/40* (2006.01)
*F16C 11/10* (2006.01)

(52) U.S. Cl.
CPC ........... *A47D 13/063* (2013.01); *A47D 13/06* (2013.01); *E05D 11/1007* (2013.01); *F16B 12/40* (2013.01); *F16C 11/10* (2013.01)

(58) Field of Classification Search
CPC .... A47D 13/063; A47D 13/06; A47D 13/061; A47D 13/065; A47D 9/00; A47D 5/00; E05D 11/1007; F16B 12/40; F16C 11/10
See application file for complete search history.

(56) References Cited

U.S. PATENT DOCUMENTS

| | | |
|---|---|---|
| 4,811,437 A | 3/1989 | Dillner et al. |
| 5,533,215 A | 7/1996 | Malofsky et al. |
| 6,256,814 B1 | 7/2001 | Drobinski |
| 6,317,907 B1 | 11/2001 | Wang |
| 6,421,850 B1 | 7/2002 | Welsh, Jr. |
| 6,510,568 B1 | 1/2003 | Drobinski et al. |
| 6,665,895 B1 | 12/2003 | St. Pierre et al. |
| 7,043,779 B2 | 5/2006 | Mendenhall et al. |
| 7,661,156 B2 | 2/2010 | Thorne et al. |
| 7,694,361 B1 | 4/2010 | Chen |
| 7,836,530 B2 | 11/2010 | Thorne et al. |
| 7,958,578 B2 | 6/2011 | Shan et al. |
| 8,011,036 B2 | 9/2011 | Tuckey |
| 8,060,959 B2 | 11/2011 | Thorne et al. |
| 8,458,829 B2 | 6/2013 | Thorne et al. |
| D688,115 S | 8/2013 | Wiegmann et al. |

(Continued)

*Primary Examiner* — David R Hare
*Assistant Examiner* — Madison Emanski
(74) *Attorney, Agent, or Firm* — Lando & Anastasi, LLP

(57) ABSTRACT

A child play yard includes a frame that includes legs, lower cross bars having first ends pivotally coupled to lower ends of the legs, and a hub pivotally coupled to second ends of the lower cross bars, the hub including a hub mechanical central tube, a column slidably disposed within the hub mechanical central tube, a hub mechanical spindle disposed within the column, and hub lock fingers pivotally coupled to a lower portion of the column and including lower feet portions, the hub mechanical spindle having an enlarged diameter lower end portion that engages lower inner sidewalls of the hub lock fingers and maintains the lower feet portions of the hub lock fingers outside a perimeter of a lower opening of the hub mechanical central tube when the hub is disposed in a lowermost position in the frame.

15 Claims, 17 Drawing Sheets

(56) References Cited

U.S. PATENT DOCUMENTS

| | | |
|---|---|---|
| 8,528,130 B2 | 9/2013 | Bu et al. |
| 8,650,678 B2 * | 2/2014 | Thorne ................ A47D 13/061 5/98.1 |
| 8,806,674 B2 | 8/2014 | Thorne et al. |
| 8,955,175 B2 | 2/2015 | Wiegmann et al. |
| 8,966,680 B2 | 3/2015 | Dowd et al. |
| 8,973,181 B2 | 3/2015 | Thorne et al. |
| 9,060,621 B2 | 6/2015 | Thorne et al. |
| 9,301,624 B2 | 4/2016 | Rosenthal et al. |
| 9,756,964 B2 | 9/2017 | Yang |
| 2003/0061657 A1 | 4/2003 | Longenecker et al. |
| 2006/0174406 A1 * | 8/2006 | Yang ................ A47D 13/063 5/99.1 |
| 2007/0017025 A1 | 1/2007 | Myer |
| 2008/189854 A1 * | 8/2008 | Thorne ................ A47D 7/002 5/99.1 |
| 2018/0008056 A1 * | 1/2018 | Yang ................ A47D 13/063 |

* cited by examiner

PLAY YARD

BACKGROUND

Aspects and examples of the present disclosure are directed generally to a foldable child enclosure, for example, a play pen, play yard, or crib, collectively referred to herein as a play yard, and to a mechanism for selectively locking a frame of the play yard in an open position and allowing the frame to be folded into a closed position.

SUMMARY

In accordance with an aspect, there is provided a child play yard including a frame. The frame comprises legs, lower cross bars having first ends pivotally coupled to lower ends of the legs, and a hub pivotally coupled to second ends of the lower cross bars. The hub includes a hub mechanical central tube, a column slidably disposed within the hub mechanical central tube, a hub mechanical spindle disposed within the column, and hub lock fingers pivotally coupled to a lower portion of the column and including lower feet portions. The hub mechanical spindle has an enlarged diameter lower end portion that engages lower inner sidewalls of the hub lock fingers and maintains the lower feet portions of the hub lock fingers outside a perimeter of a lower opening of the hub mechanical central tube when the hub is disposed in a lowermost position in the frame.

In some embodiments, the enlarged diameter lower end portion of the hub mechanical spindle engages internal angled sidewalls of the hub lock fingers and displaces the lower feet portions of the hub lock fingers to a position below and within the perimeter of the lower opening of the hub mechanical central tube when the hub is displaced a first distance above the lowermost position in the frame. The column may be displaced upward through the hub mechanical central tube when the hub is displaced the first distance above the lowermost position in the frame. The column may be displaced further upward through the hub mechanical central tube and the hub lock fingers are drawn into the hub mechanical central tube when the hub is displaced a second distance greater than the first distance above the lowermost position in the frame.

In some embodiments, the lower cross bars include lower fourbar tops and lower fourbar bottoms. The hub may further include a base, second ends of the lower fourbar bottoms being pivotally coupled to the hub with pivot pins fixedly coupled to lower internal walls of the base of the hub. The hub may further includes linkage interfaces disposed within the base, second ends of the lower fourbar tops being pivotally coupled to the hub with first pivot pins fixedly secured to upper internal walls of the base of the hub and by second pins that slide through slots defined in the linkage interfaces.

In some embodiments, the child play yard further comprises upper cross bars extending between respective pairs of the legs, the upper cross bars including first portions and second portions, the first and second portions being locked in alignment with one another when the hub is disposed in the lowermost position in the frame. The first and second portions may be locked in alignment with one another when the hub is disposed in the lowermost position in the frame by plungers internal to the first and second portions that are biased by springs into contact with surfaces of strike plates disposed between ends of the first and second portions. Displacement of the hub to a position above the lowermost position in the frame may cause the first ends of the lower fourbar tops to pull on foot linkages disposed on lower portions of the legs that in turn pull indirectly on cables that pass into the first and second portions of each upper cross bar and pull the plungers out of engagement with the strike plates.

In some embodiments, the child play yard further comprises a spring disposed about an upper portion of the hub mechanical spindle and biasing the hub mechanical spindle downward through the column.

In some embodiments, the child play yard further comprises a hub cover and a middle central piece slidably disposed within a recess defined in the hub cover, an upper end of the hub mechanical spindle being secured to the middle central piece. An upper end of the column may be secured to a bottom surface of the hub cover.

In some embodiments, the child play yard further comprises mechanical stops extending from a lower surface of the middle central piece that limit relative displacement between the hub cover and middle central piece.

In accordance with another aspect, there is provided a child play yard including a frame comprising legs, lower cross bars having first ends pivotally coupled to lower ends of the legs and second ends pivotally coupled to a hub disposed substantially centrally within a periphery of the frame, the hub including hub lock fingers pivotally coupled to the hub and including lower feet portions, and a hub mechanical spindle having an enlarged diameter lower end portion that engages lower inner sidewalls of the hub lock fingers and maintains the lower feet portions of the hub lock fingers outside a perimeter of a lower opening of the hub when the hub is disposed in a lowermost position in the frame. The frame further comprises upper cross bars extending between respective pairs of the legs, the upper cross bars including first and second sections with ends disposed proximate midpoints of the upper cross bars, the first and second sections being locked into alignment with one another when the hub is disposed in the lowermost position. Displacement of the hub upward from the lowermost position causes the hub mechanical spindle to engage internal angled sidewalls of the hub lock fingers and cause the hub lock fingers to pivot and the lower feet portions to be drawn into the lower opening of the hub, the lower cross bars to pivot relative to the hub and the legs and to draw the legs inward toward the hub, the first ends of the lower cross bars to pull indirectly on cables passing into the upper cross bars, the cables disengaging plungers from strike plates in the upper cross bars and unlocking the first and second sections of the upper cross bars from each other, and the upper cross bars to fold and the ends of the first and second sections of the upper cross bars to be drawn downward.

In some embodiments, the hub further comprises a hub mechanical central tube, a column slidably disposed within the hub mechanical central tube, the hub mechanical spindle disposed within the column, the hub lock fingers pivotally coupled to a lower portion of the column, the displacement of the hub upward from the lowermost position further causing the column to be displaced upward through the hub mechanical central tube.

In some embodiments, the child play yard further comprises a linkage interface to which the second ends of the lower cross bars are pivotally coupled, the displacement of the hub upward from the lowermost position further causing the linkage interface to be displaced upward through the hub.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
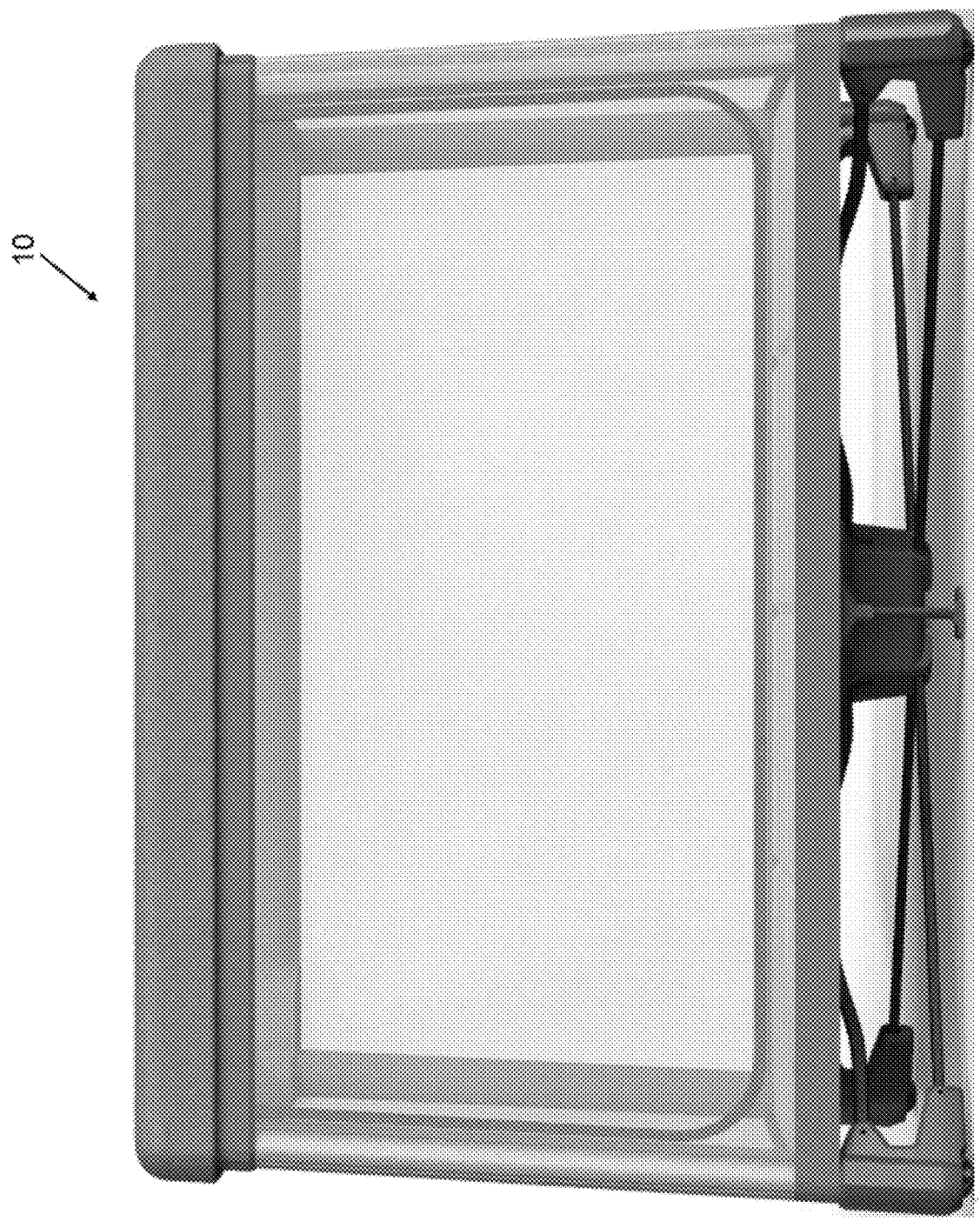
FIG. 1A is an elevational view from the front of a play yard.
Figure 1B:
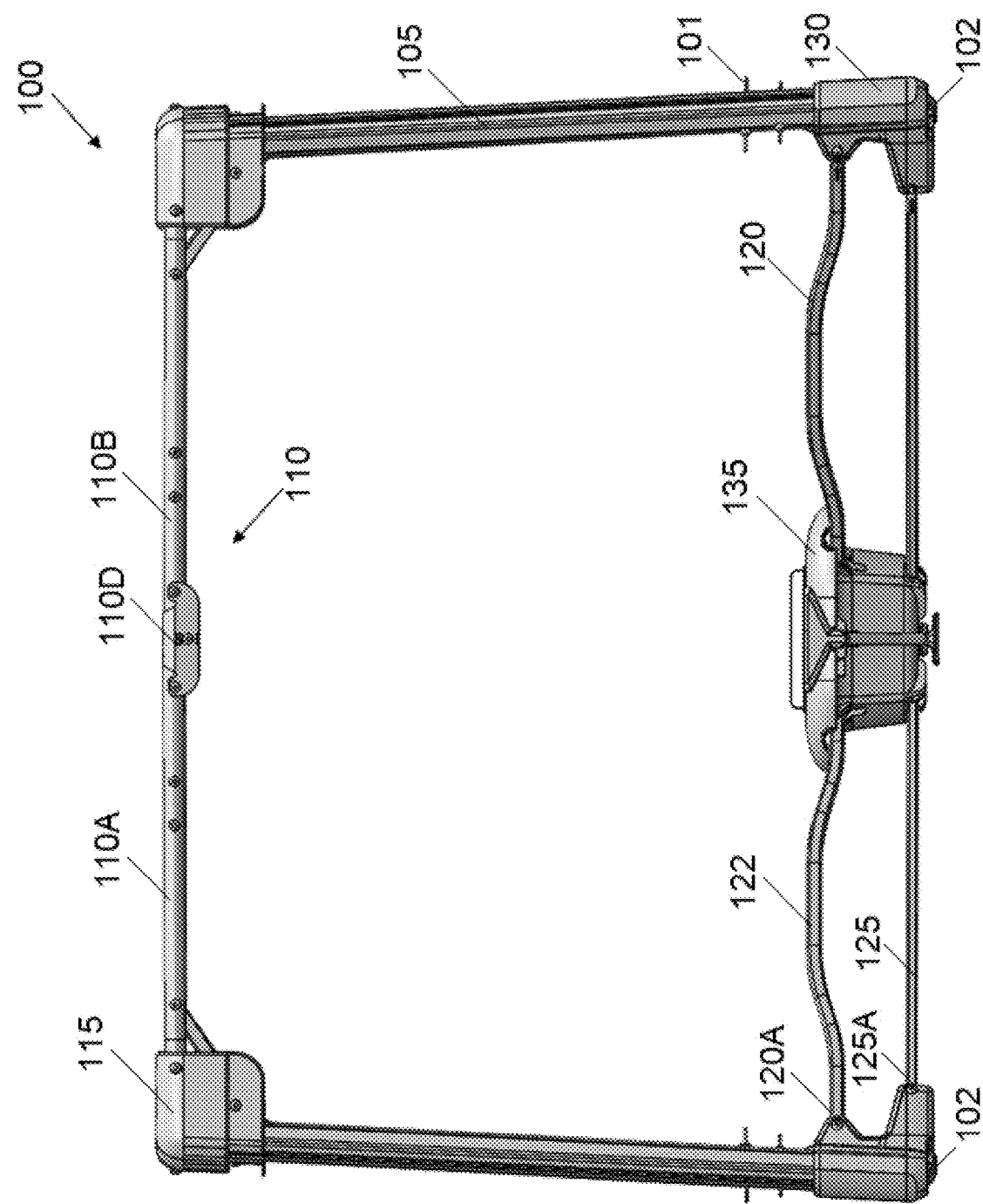
FIG. 1B is an elevational view from the front of a frame for a play yard.

The disclosure is not limited in its application to the details of construction and the arrangement of components set forth in the following description or illustrated in the drawings. The disclosure is capable of other examples and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional terms.

Parents or caregivers of young children may place the children in an enclosure, referred to herein as a play yard, that provides for the children to play with toys or rest while preventing the children from wandering and potentially injuring themselves. A play yard may include a frame that supports a lower floor, for example, a mattress or other soft surface, and upright legs and cross rails that support an enclosing material, for example, a fabric or mesh. In various implementations the frame may lock in an open position during use and include a mechanism to unlock the frame to allow it to be folded into a small form factor for transport or storage. One example of a play yard is illustrated generally at 10 in FIG. 1A.

Figure 2:
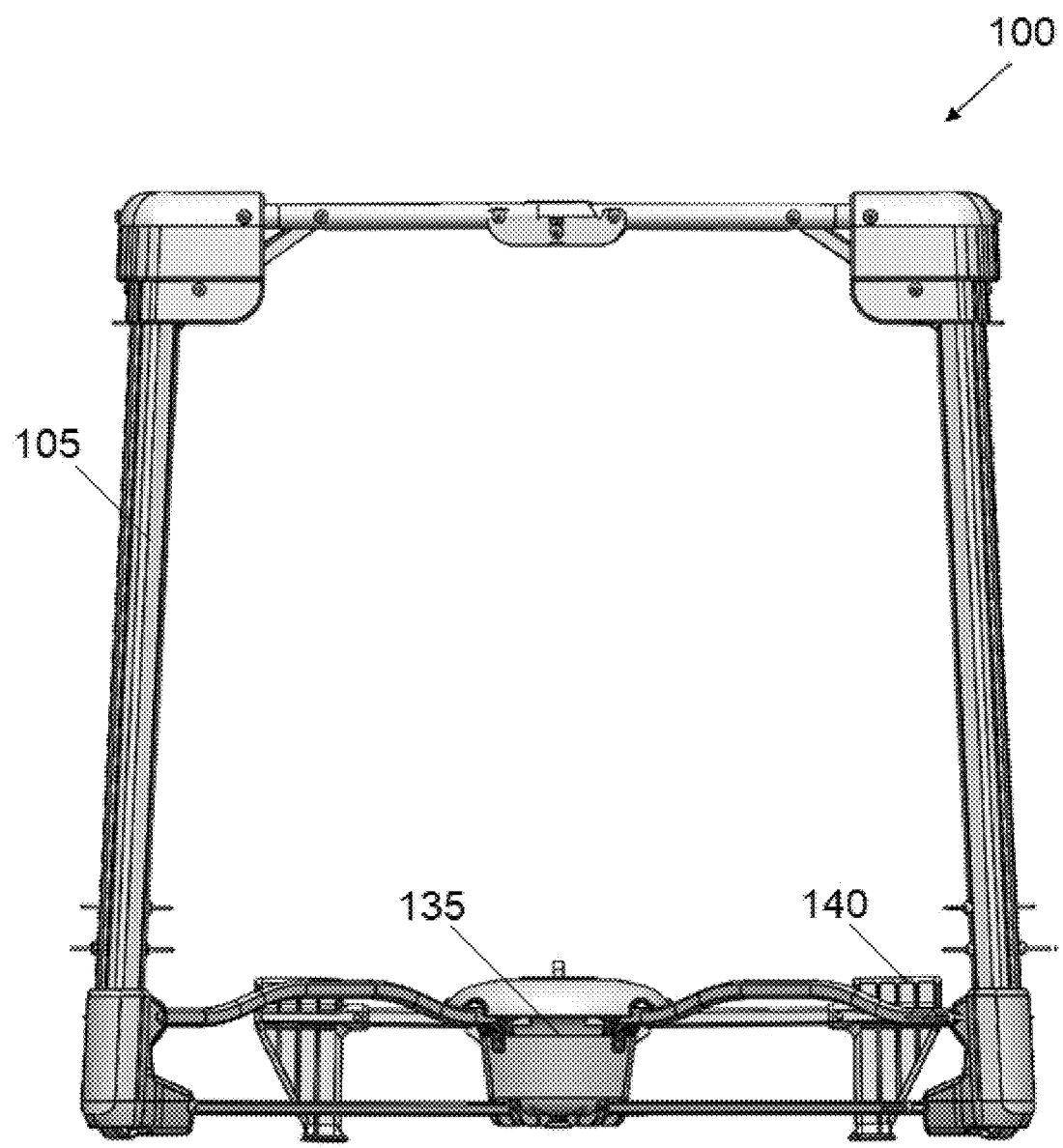
FIG. 2 is an elevational view from the side of a frame for a play yard.
Figure 3:
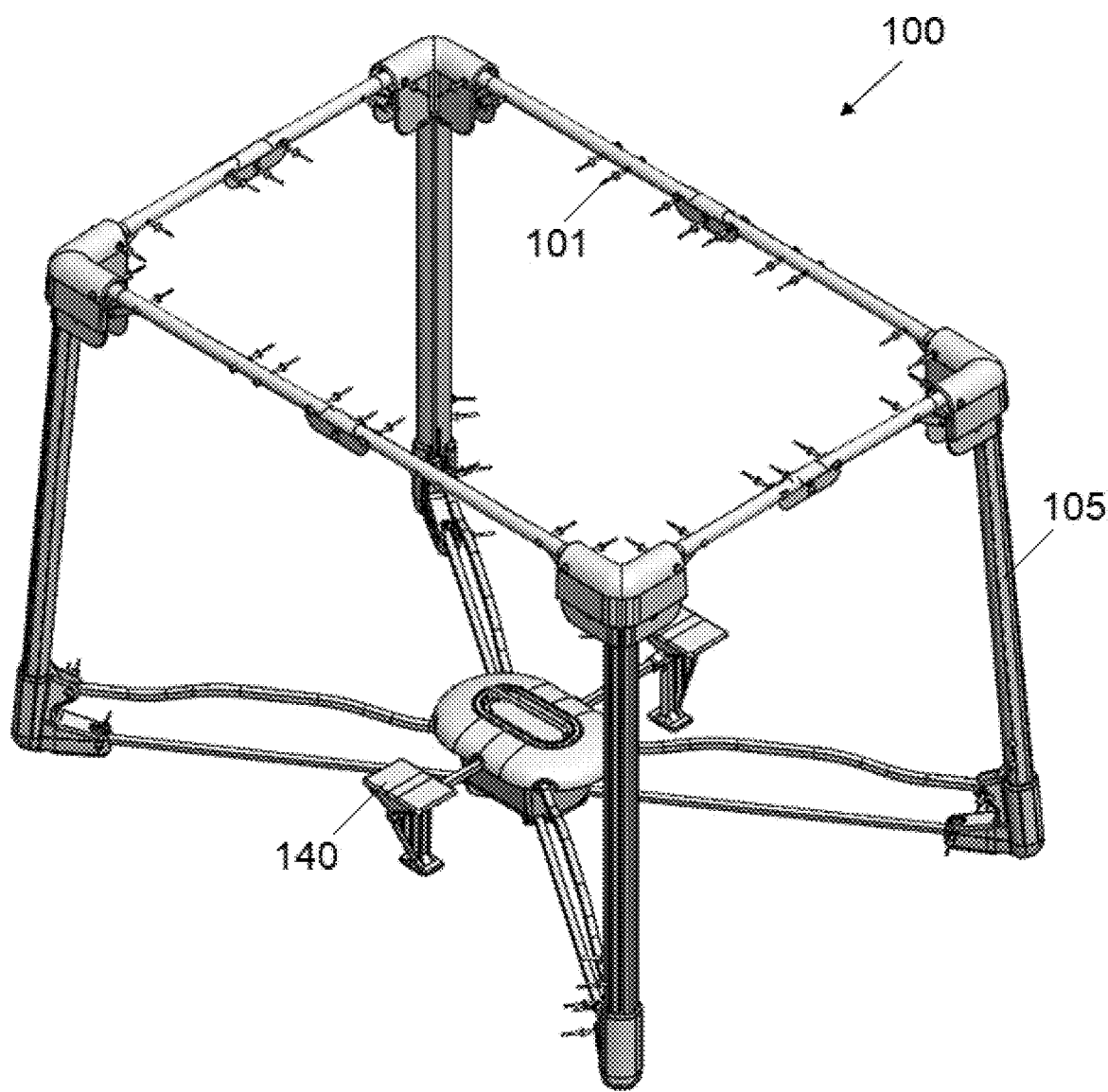
FIG. 3 is an isometric view of a frame for a play yard.
Figure 4A:
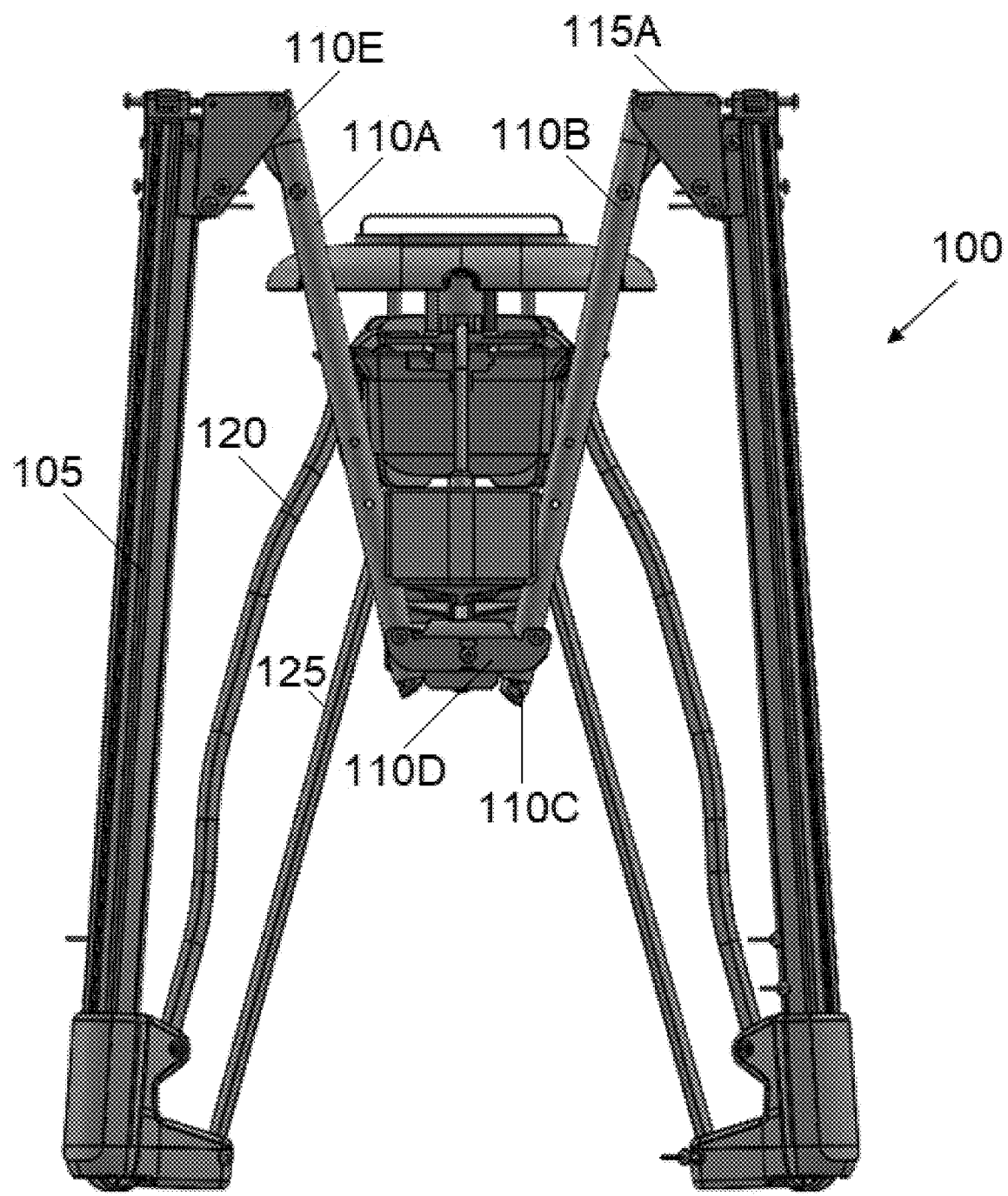
FIG. 4A is an elevational view of a frame for a play yard in a partially folded configuration.
Figure 4B:
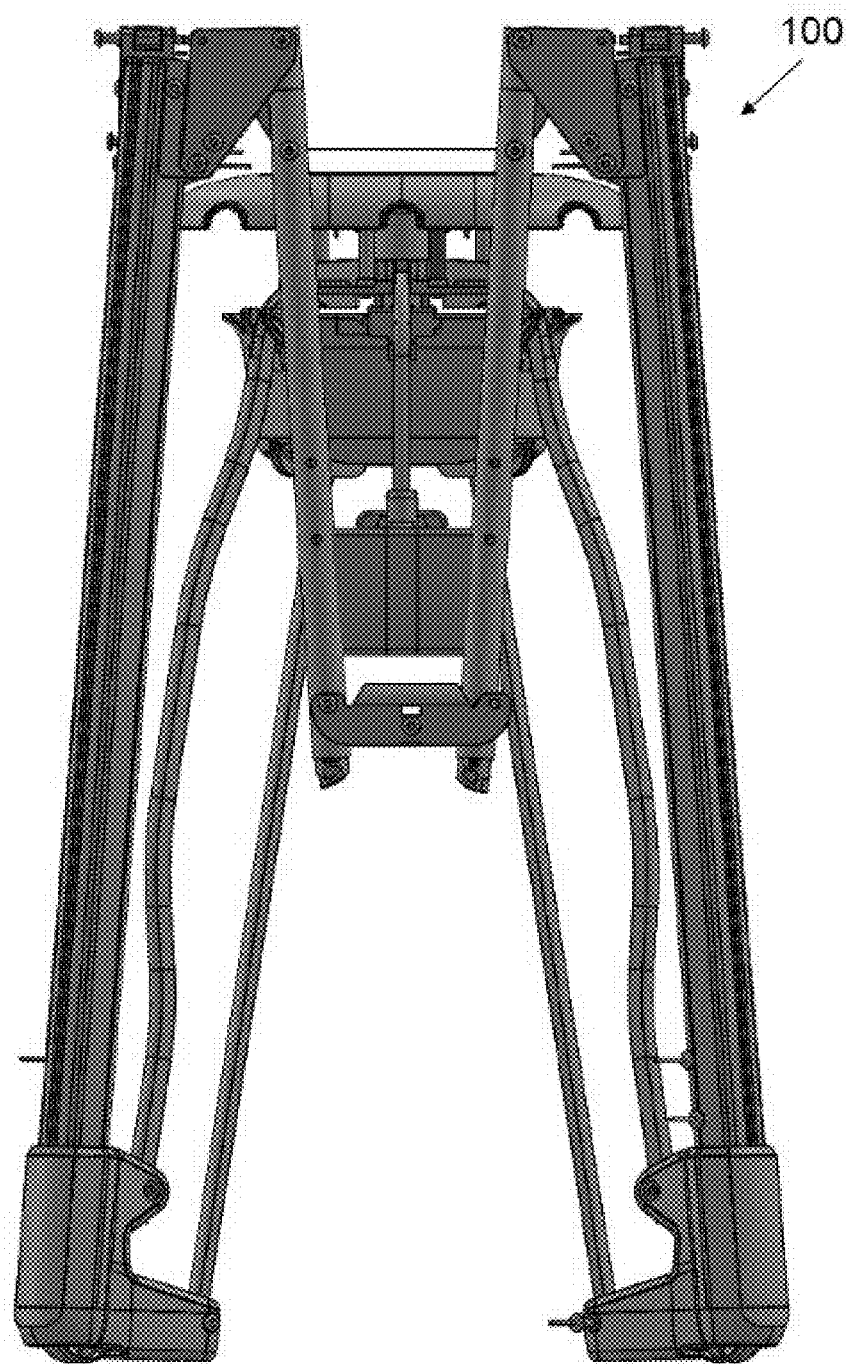
FIG. 4B is an elevational view of the frame for a play yard of FIG. 4A in a fully folded configuration.

FIGS. 1B-3 illustrate the frame 100 of an embodiment of a play yard in an open arrangement in a front view, side view, and isometric view, respectively. Fabric may be disposed on the frame 100 to form walls of the play yard and a floor as illustrated in FIG. 1A. The fabric covers the bottom structure (cross bars) of the play yard and a mattress attaches on top of that fabric to create a floor. The fabric that would be disposed on the frame 100 during use is omitted from further figures to allow the features of the frame to be more clearly visible. FIG. 4A illustrates the frame 100 in a partially folded arrangement. FIG. 4B illustrates the frame 100 in a fully folded arrangement. Rivets/pivot pins 101 are illustrated in various of the figures presented herein protruding from portions of the frame 100, but with the frame 100 in an assembled condition, these rivets/pivot pins would be flush with walls of the portions of the frame 100.

The frame 100 of the play yard includes four generally vertically extending legs 105 which, as illustrated in FIGS. 1A-3, may be oriented at a small angle, for example, 1-10 degrees tilted toward the center of the play yard, relative to vertical when the frame 100 is upright in an open configuration. Wheels 102 may be provided on the lower ends of the legs 105 to help the legs 105 slide inward and outward as the frame 100 transitions between open and folded configurations and back. The legs 105 are coupled to upper cross bars 110 at the top of the frame 100 through upper corner linkage covers 115. The upper cross bars 110 include two portions 110A, 110B. The cross bar portions 110A, 110B have proximal ends 110C (see FIG. 4A) that are pivotally joined together with cross bar latches 110D. Distal ends 110E of the cross bar portions 110A, 110B are pivotally coupled to a corner plate 115A within the respective upper corner linkage covers 115. (See FIG. 4A in which upper corner linkage covers are removed to illustrate corner plate 115A.)

The frame 100 further includes lower cross bars, referred to as lower fourbar tops 120 and lower fourbar bottoms 125 having distal ends 120A, 125A pivotally coupled to lower corner linkage covers 130. The lower fourbar tops 120 may include flattened middle portions 122 that may be used to support a mattress in the play yard 10. Proximal ends 120B, 125B (see FIG. 7) of the lower fourbar tops 120 and lower fourbar bottoms 125 are pivotally coupled to a hub 135 that is disposed generally centrally in a bottom portion of the frame 100. As discussed in further detail below, the hub 135 includes a mechanism for maintaining the lower fourbar tops 120 and lower fourbar bottoms 125 in a horizontal orientation when the frame is locked, but allows for the lower fourbar tops 120 and lower fourbar bottoms 125 to rotate about pivot points within the hub 135 and the lower corner linkage covers 130 when the frame 100 is unlocked to allow the frame 100 to be folded.

Also pivotally coupled to the hub 135 are a pair of stabilizer legs 140. The stabilizer legs 140 help to keep the play yard from tipping over when the stabilizer legs 140 are in their extended position. The stabilizer legs 140 may also rotate about pivot points within the hub 135 when the frame 100 is unlocked to allow the frame 100 to be folded.

Figure 5:
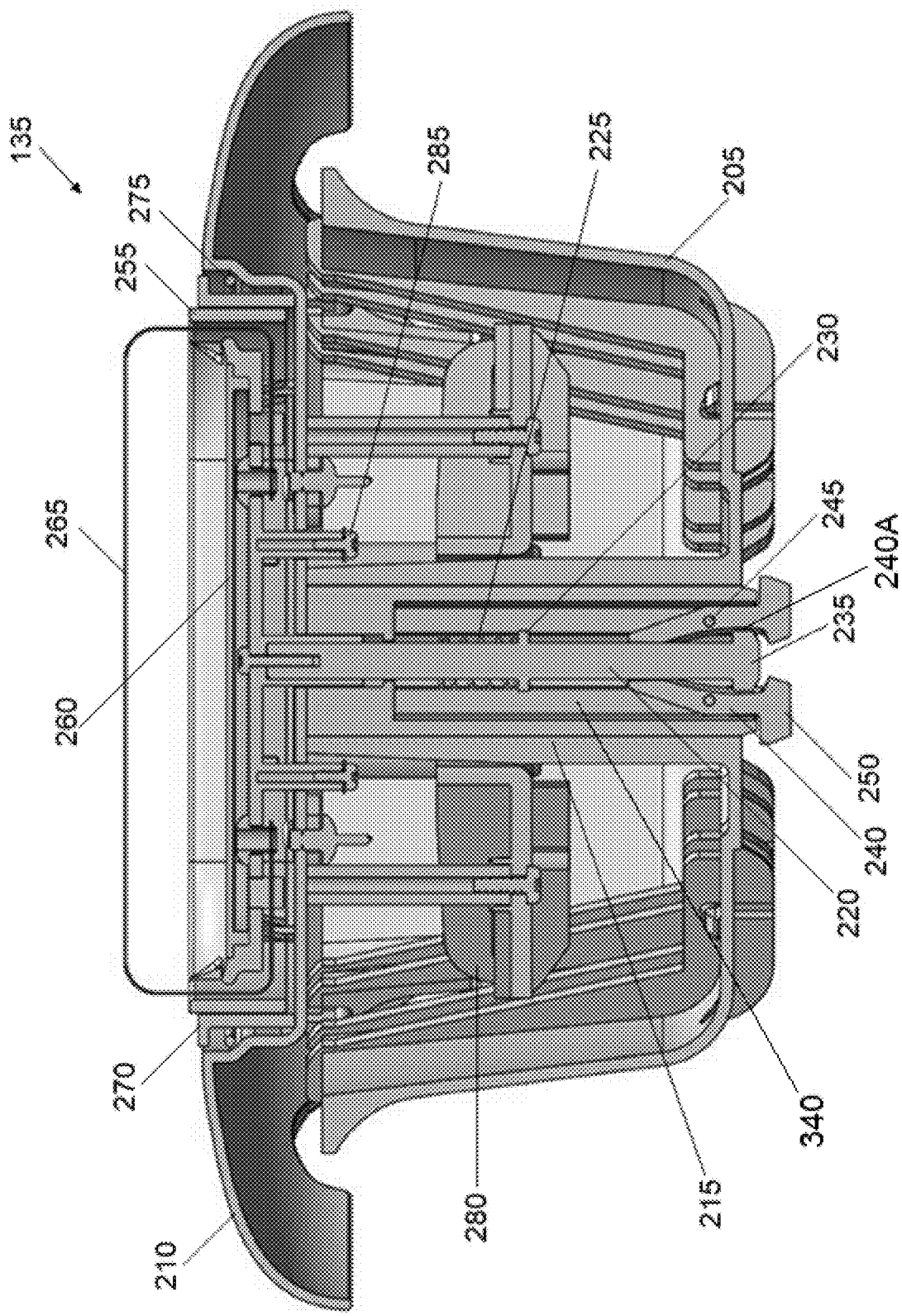
FIG. 5 is a cross-sectional view of a hub assembly of a play yard in a locked state.

A number of internal and external features of the hub 135 are illustrated in FIG. 5. The hub 135 includes a hub base housing 205 and a hub cover 210. A hub mechanical central tube 215 having a vertical axis is defined centrally within the hub base housing 205. Within the hub mechanical central tube 215 is disposed a column 340 housing a hub mechanical spindle 220. The hub mechanical spindle 220 may travel up and down through column 340 but is biased downward by a spring 225 surrounding an upper portion of the hub mechanical spindle 220 within the column 340 and pushing downward on a flange portion 230 of the hub mechanical spindle 220. The column 340 is free to slide up and down through the hub mechanical central tube 215 when the hub is unlocked. The hub mechanical spindle 220 has an enlarged diameter lower end portion 235 that engages inner sidewalls of hub lock fingers 240. The hub lock fingers 240 may rotate about pivot pins 245 that are mounted to a lower portion of the column 340. Feet portions 250 are defined at lower portions of the hub lock fingers 240. When the lower end portion 235 of the hub mechanical spindle 220 is in the lower position illustrated in FIG. 5, it engages lower inner sidewalls 240A of the hub lock fingers 240. In this position, the lower end portion 235 of the hub mechanical spindle 220 keeps outer sides of the feet portions 250 of the hub lock fingers 240 below and outside of a perimeter of a lower opening 215A (indicated in FIG. 7) in the hub mechanical central tube 215. The feet portions 250 are thus prevented from entering the hub mechanical central tube 215.

A central retaining ring 270 and bottom softgoods ring 275 are provided in an upper portion of the hub 135 to secure fabric forming walls and/or covering a floor of the play yard to the hub 135. The hub 135 further includes a middle central piece 255 and a central loop cap 260 that seals an upper end of the middle central piece 255. The middle central piece 255 is disposed within the central retaining ring 270 in a recess defined in the hub cover 210 and can slide up and down in the recess and central retaining ring 270. A pull strap 265 is secured to and extends above the central loop cap 260. The hub also includes linkage interfaces 280 to which the lower fourbar tops 120, lower fourbar bottoms 125, and stabilizer legs 140 are coupled as explained in further detail below. A screw and washer assembly 285 extending from a lower surface of the middle central piece 255 forms a mechanical stop that limits upward motion of the upper portion of the hub 135, hub mechanical spindle 220, and related portions of the hub 135 relative to the hub cover 210 when a user pulls on the pull strap 265 to unlock the hub as also described in further detail below.

Figure 6:
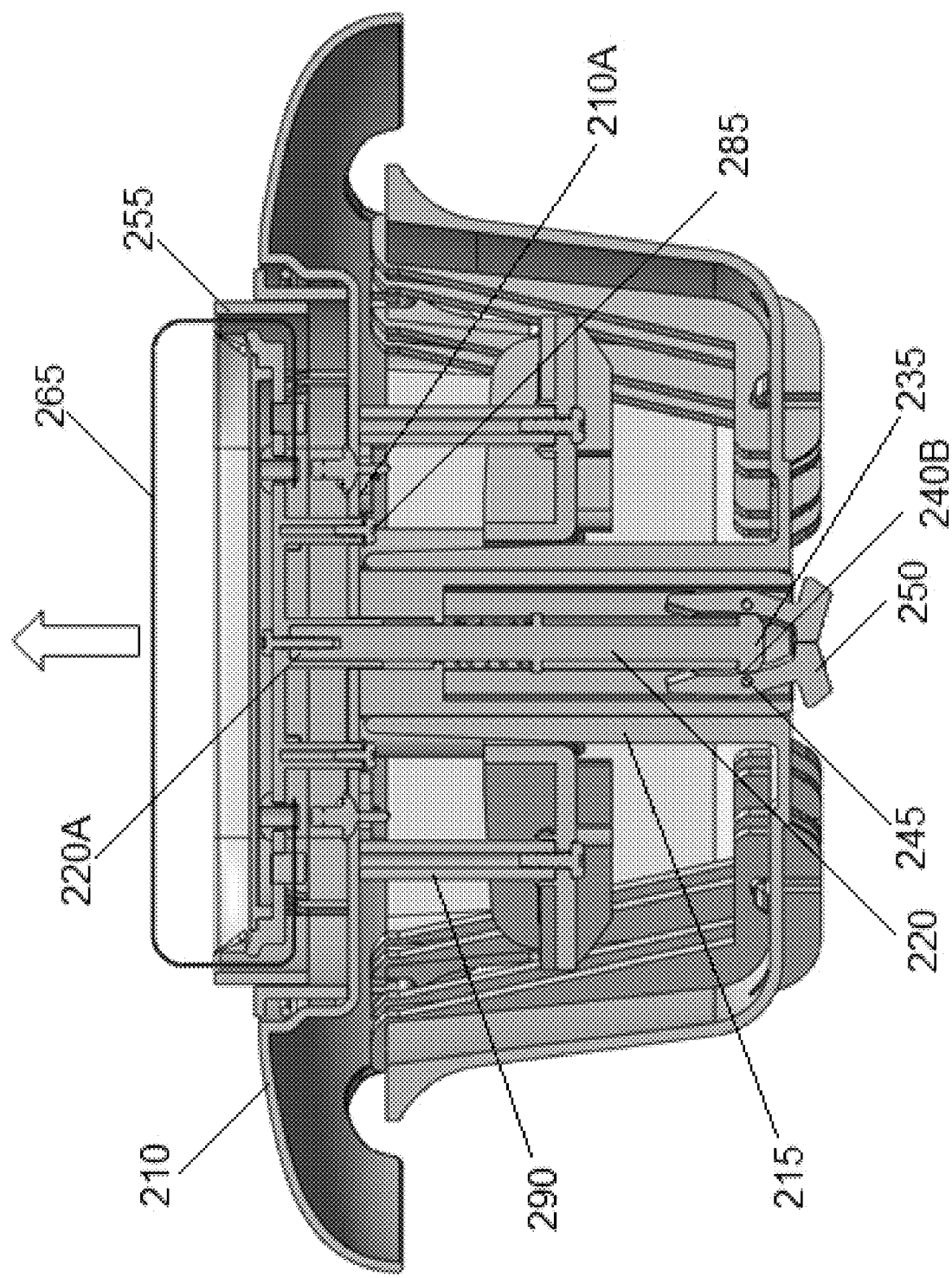
FIG. 6 is a cross-sectional view of a hub assembly of a play yard in an unlocked state.

Unlocking of the hub 135 is described with reference to FIGS. 6 and 7. As illustrated in FIG. 6, as one pulls upward on the pull strap 265, the middle central piece 255 is drawn upward relative to the hub cover 210. The middle central piece 255 may be drawn upward relative to the hub cover 210 until the screw and washer assembly 285 contact the lower wall 210A of the hub cover 210. The hub mechanical spindle 220 is attached to the middle central piece 255 at its upper end 220A and is also drawn upward relative to the hub cover 210 and the hub mechanical central tube 215 as one pulls upward on the pull strap 265. As the hub mechanical spindle 220 is drawn upward, sides of the enlarged diameter lower end portion 235 push against internal angled sidewalls 240B of the hub lock fingers 240. This causes the hub lock fingers 240 to rotate about the pivot pins 245, which in turn causes the feet portions 250 to draw inward until they are below and within the perimeter of the lower opening 215A in the hub mechanical central tube 215 and can pass through the lower opening 215A in the hub mechanical central tube 215.

Figure 7:
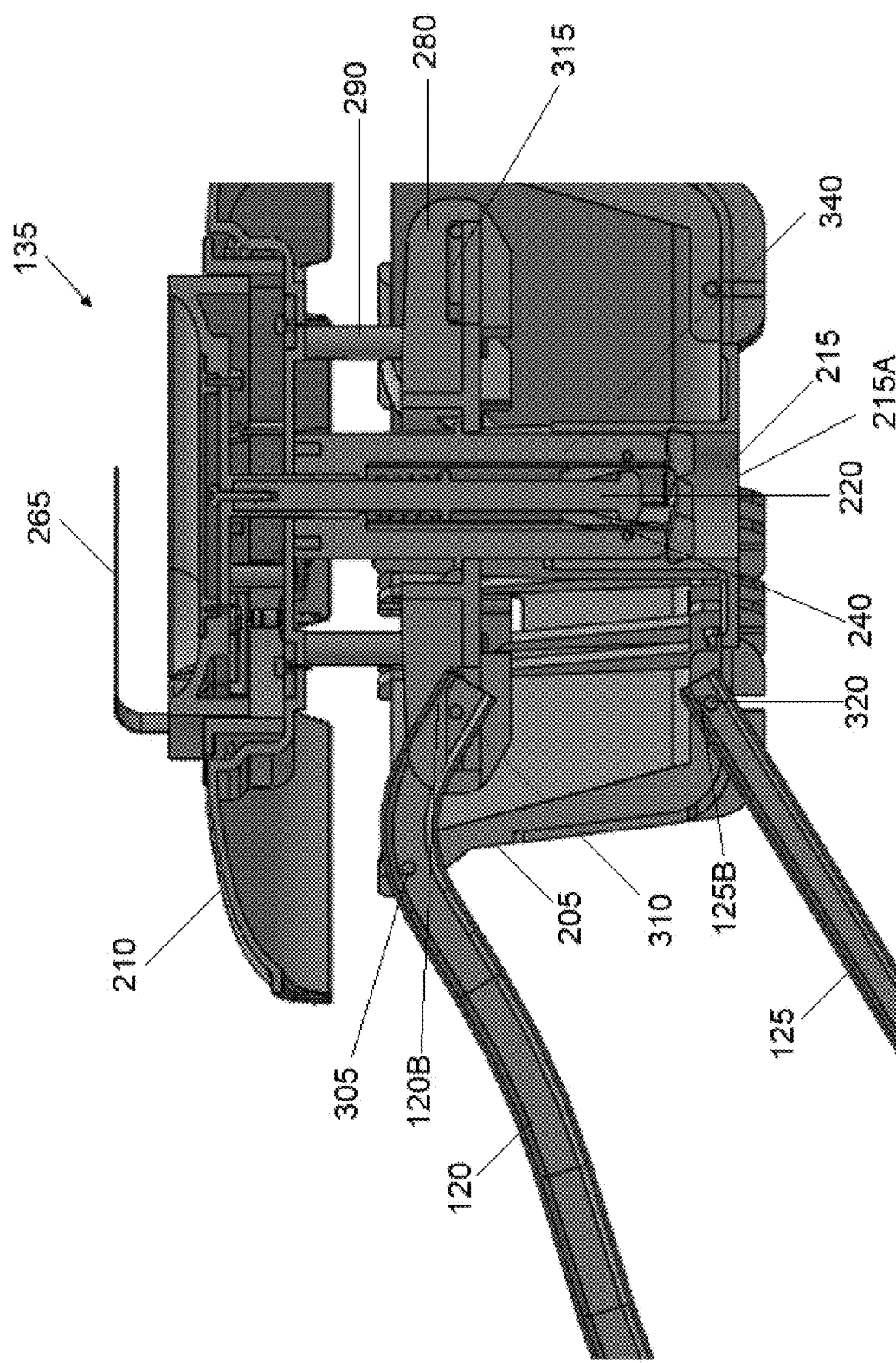
FIG. 7 is a cross-sectional view of a portion of a hub assembly and attached lower cross bars of a play yard in an unlocked state.

As one continues to pull upward on the pull strap 265, the column 340, hub mechanical spindle 220 and lock fingers 240 are drawn upward through the hub mechanical central tube 215 as illustrated in FIG. 7. The hub cover 210 is displaced from the hub base housing 205 and is maintained in connection with the hub base housing 205 by connector columns 290 that are drawn from within the hub base housing 205 and connect the hub cover 210 to a body forming the linkage interfaces 280. The column 340 is attached to the hub cover 210 at its upper end and is drawn upward relative to the hub mechanical central tube 215 as one pulls upward on the pull strap 265 and the hub cover 210 is displaced from the hub base housing 205.

FIG. 7 also illustrates how the lower fourbar tops 120 and lower fourbar bottoms 125 rotate relative to the hub 135 as one pulls the hub 135 upward with the pull strap 265. The lower fourbar tops 120 are coupled to the hub 135 by stationary pivot pins 305 disposed on upper internal walls of the base of the hub 135 and by second pins 310 that slides through slots 315 defined in the linkage interfaces 280. As the hub 135 is lifted the lower fourbar top 120 illustrated in FIG. 7 would rotate counterclockwise about pivot 305 while the pin 310 slides first inward toward the center of the hub and then outward through the slot 315 in the linkage interface. The lower fourbar bottoms 125 are coupled to the hub 135 by stationary pivot pins 320 disposed on lower internal walls of the base of the hub 135. As the hub 135 is lifted the lower fourbar bottom 125 illustrated in FIG. 7 would rotate counterclockwise about pivot 320.

Figure 8:
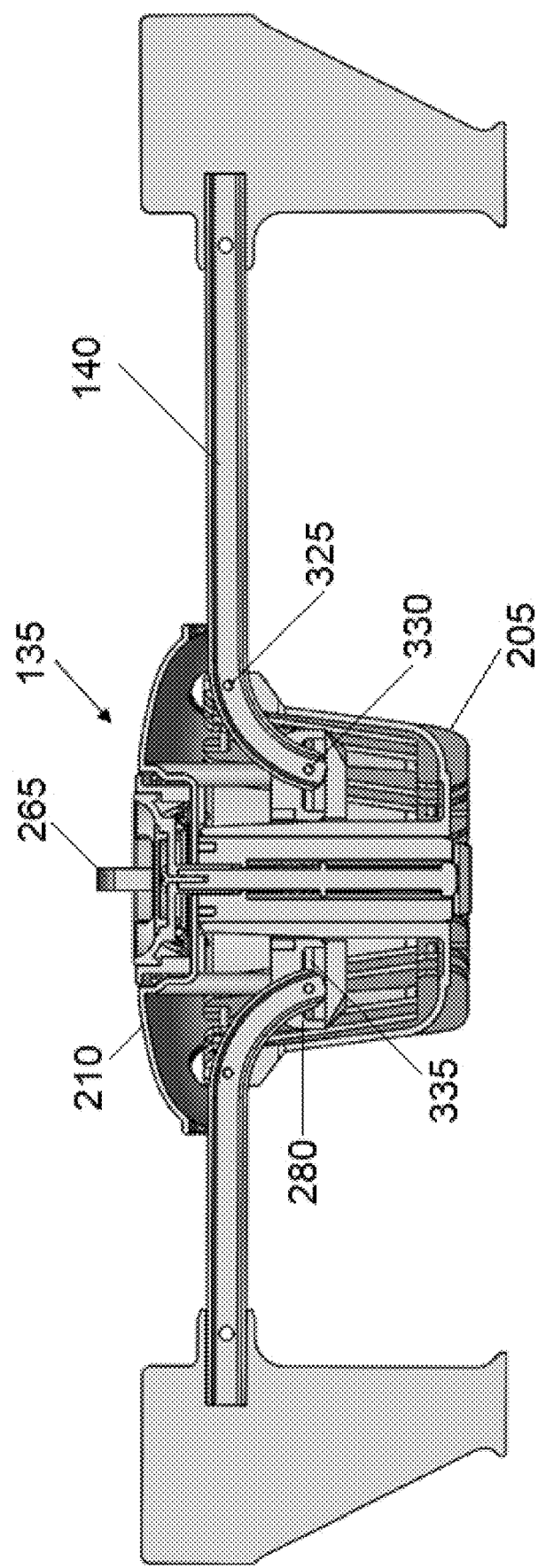
FIG. 8 is a cross-sectional view of a hub assembly of a play yard and attached stabilizer legs in a locked state.

As illustrated in FIG. 8, the stabilizer legs 140 are coupled to the hub 135 with stationary pins 325 disposed on upper internal walls of the base of the hub 135 and by second pins 330 that slide through slots 335 defined in another linkage interface 280 in a similar manner as the lower fourbar tops 120. As the hub 135 is lifted the stabilizer leg 140 on the right side of FIG. 8 would rotate clockwise about pin 325 while the pin 330 slides first inward toward the center of the hub and then outward though the slot 335 in the linkage interface. The stabilizer leg 140 on the left side of FIG. 8 would rotate counterclockwise about its corresponding pin 325 while the corresponding pin 330 slides first inward and then outward though the slot 335 in the corresponding linkage interface.

Each lower fourbar top 120 and stabilizer leg 140 is coupled to a different linkage interface 280. The different linkage interfaces 280 together form a linkage interface body, illustrated disposed between the hub base housing 205 and hub cover 210 in FIG. 10.

Figure 9A:
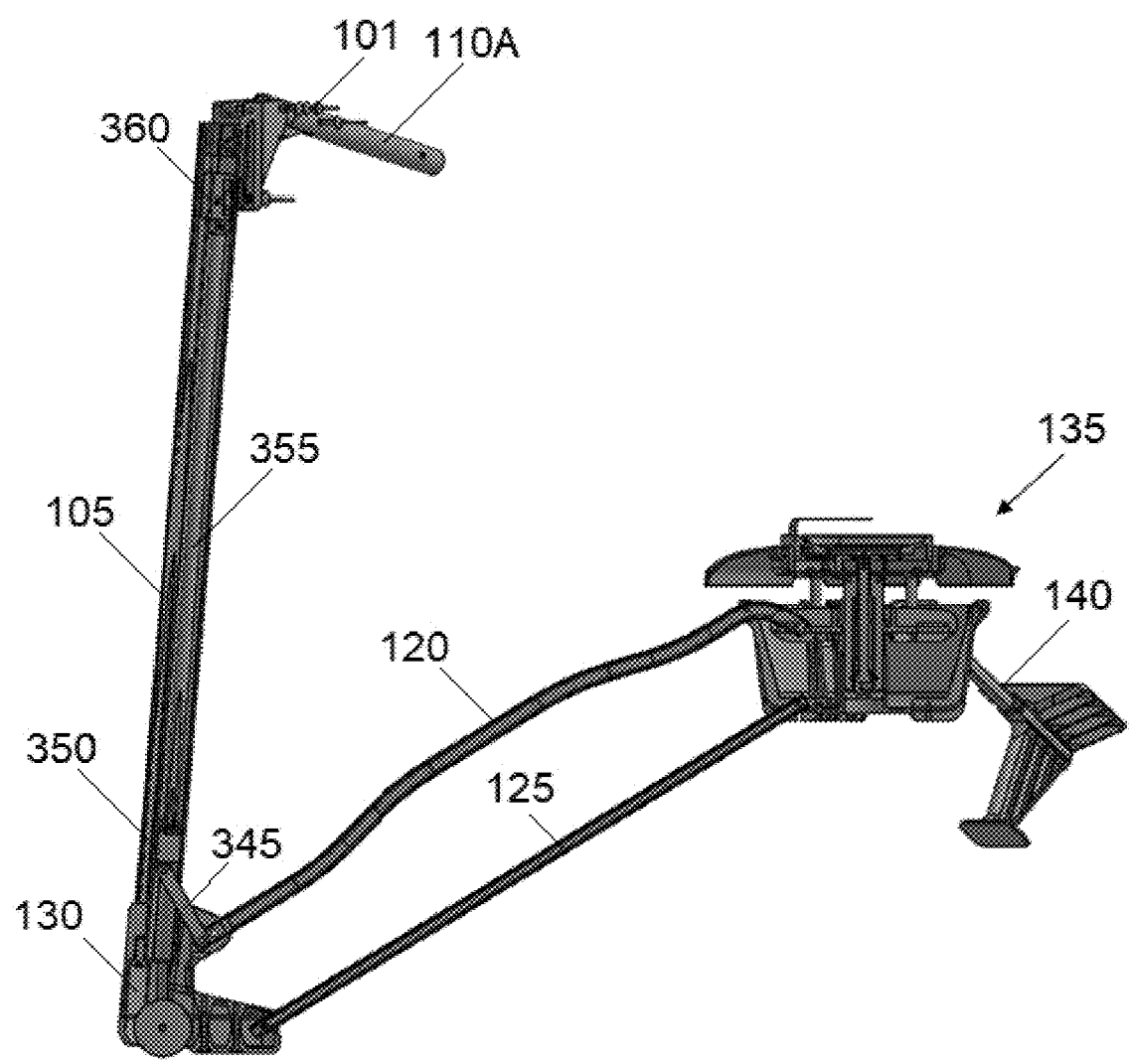
FIG. 9A is a partially cross-sectional view of a frame of a play yard in a partially folded state.
Figure 10:
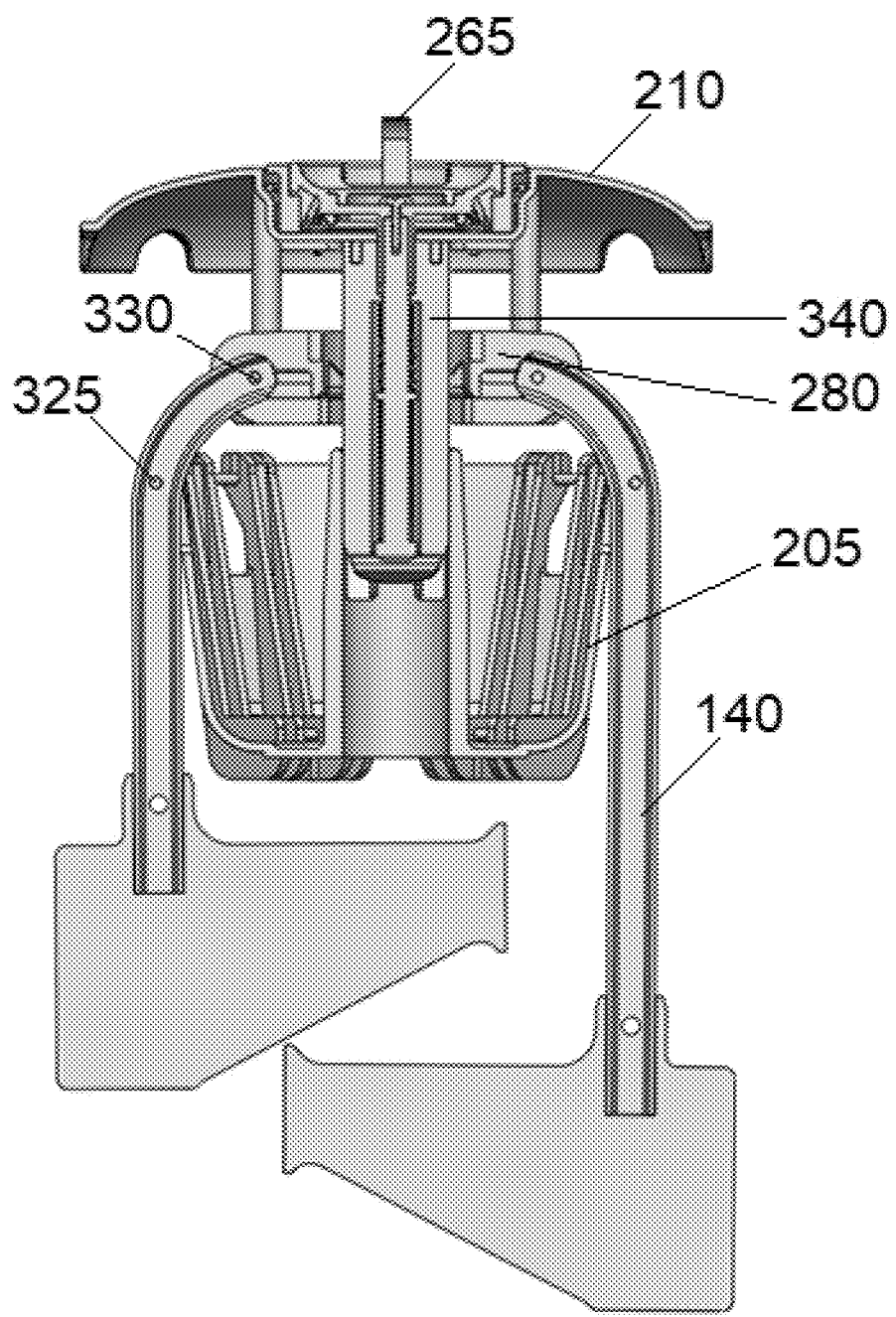
FIG. 10 is a cross-sectional view of a hub assembly of a play yard and attached stabilizer legs in an unlocked state.

As the hub 135 is pulled upward, the frame 100 of the play yard begins to fold as illustrated in FIG. 9A, in which only a portion of the frame 100 is illustrated for clarity. FIG. 10 illustrates the configuration of the hub 135 and stabilizer legs 140 when the hub 135 is at its uppermost position and the frame 100 is fully folded. The lower fourbar tops 120 and lower fourbar bottoms 125 are omitted from FIG. 10 for clarity. As illustrated in FIG. 10, when the hub 135 is at its uppermost position and the frame 100 is fully folded, the linkage interfaces 280 forming the linkage interface body are drawn upward and outward from the hub base housing 205 on column 340 that houses the hub mechanical spindle 220 and hub lock fingers 240. The lower portion of the column 340 remains within the hub mechanical central tube 215. Pivot pins 325 and stationary pivot pins 305 associated with the lower fourbar tops 120 prevent further movement of the hub cover 210 from the hub base housing 305.

Figure 11A:
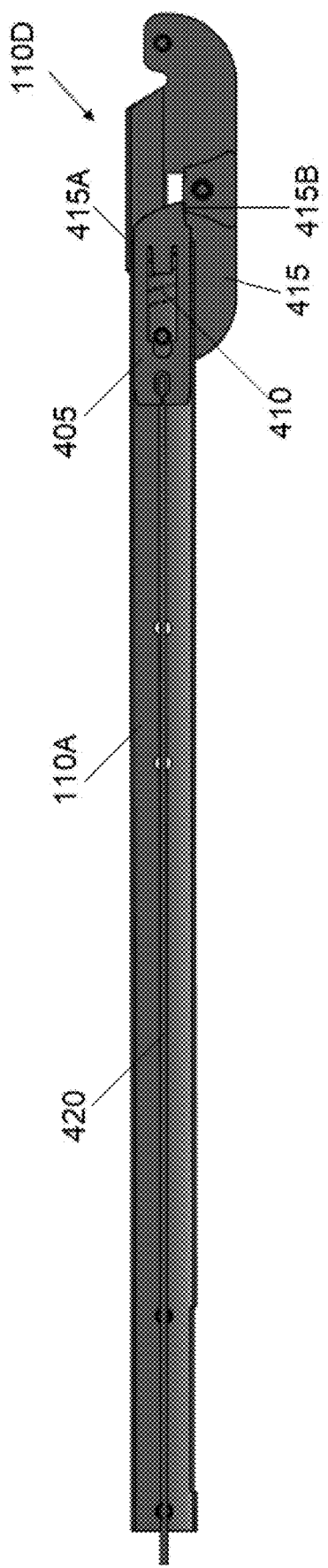
FIG. 11A is a partial cross-sectional view of an upper cross bar of a play yard in a locked state.

As the frame 100 of the play yard folds, the two portions 110A, 110B of each upper cross bar 110 unlock and the upper cross bars 110 fold about the cross bar latches 110D as illustrated in FIGS. 4A and 4B. Referring to FIG. 11A, when the frame 100 is in its opened locked configuration, plungers 405 within the two portions 110A, 110B of each cross bar 110 are biased by springs 410 into engagement with surfaces 415A, 415B of a strike plate 415 within the cross bar latches 110D (only one portion 110A illustrated). Engagement of the plungers 405 with the surfaces 415A, 415B of the strike plate 415 prevent the two portions 110A, 110B of each upper cross bar 110 from rotating relative to the cross bar latches 110D or relative to one another. As the hub 135 is pulled upward and the frame 100 begins to fold, the lower fourbar tops 120 pull on foot linkages 345 (see FIG. 9A) that in turn pull on bottom bearings 350 within the legs 105.

Figure 9B:
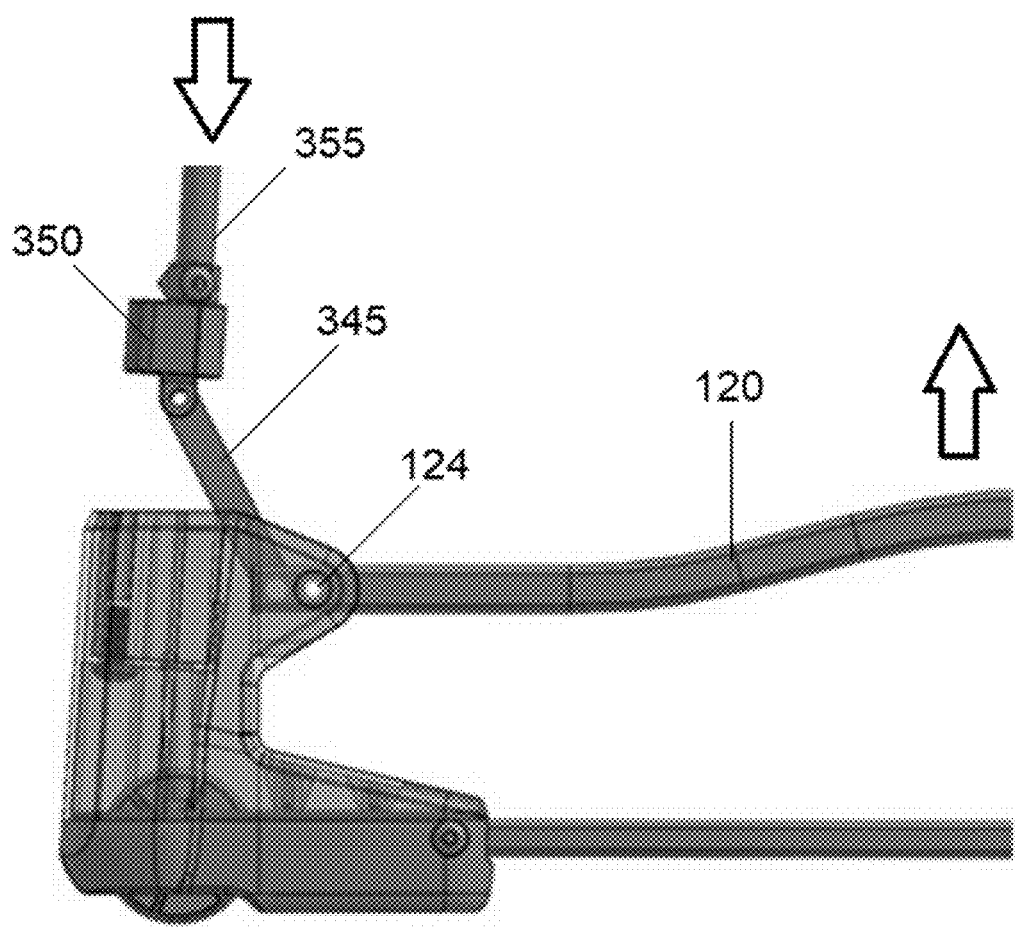
FIG. 9B illustrates further details of a lower corner assembly of a play yard.
Figure 11B:
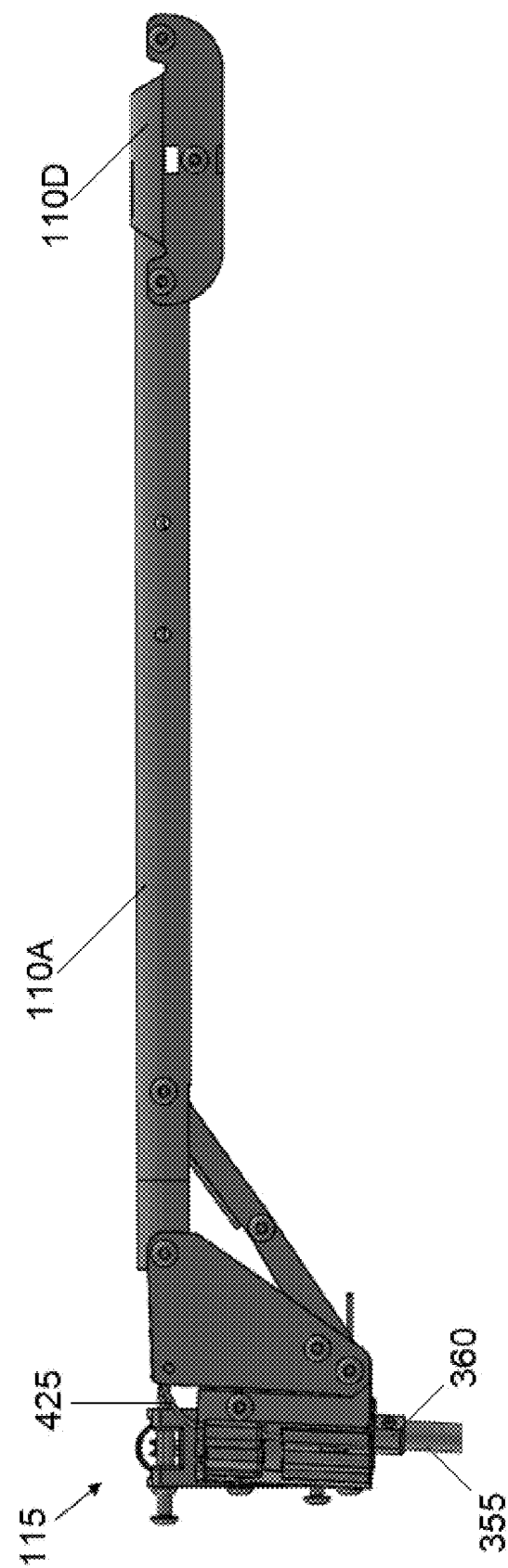
FIG. 11B illustrates routing of a cable from a rod within a leg of a play yard to a locking mechanism in an upper cross bar of a play yard.
Figure 11C:
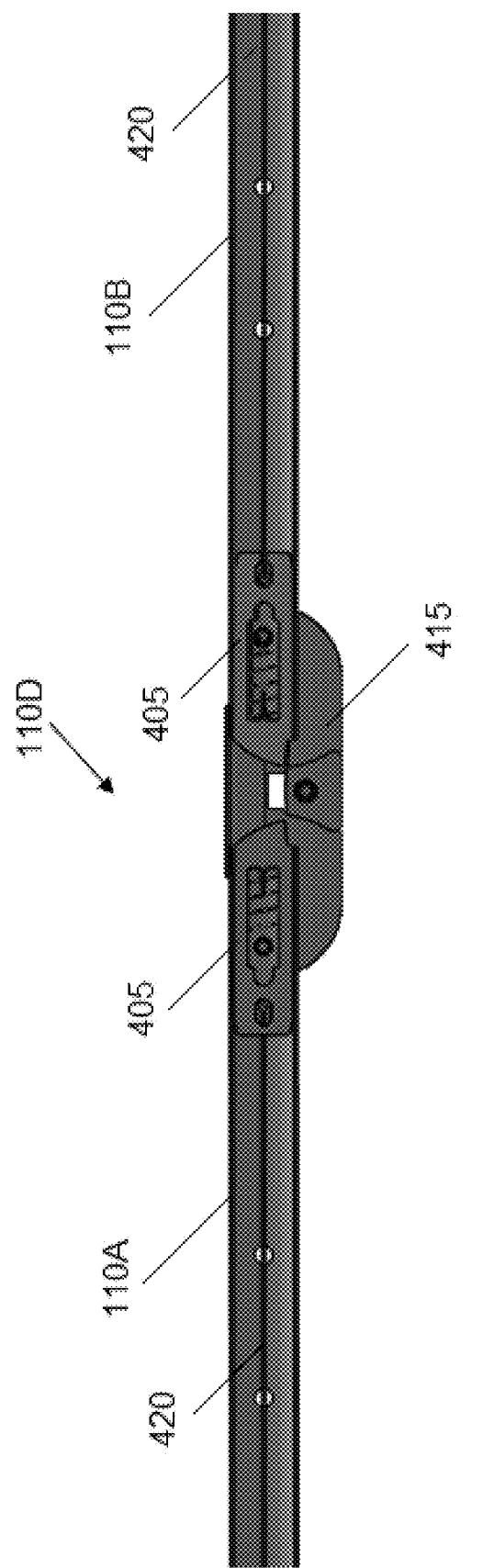
FIG. 11C is a partial cross-sectional view of an upper cross bar of a play yard in an unlocked state.

The tops of the bottom bearings 350 are attached to lower ends of leg rods 355 that extend through the legs and connect on their upper ends to upper bearings 360 proximate the tops of the legs 305. FIG. 9B provides further details illustrating that as the lower fourbar tops 120 rotate upward with the raising of the hub 135, the distal ends of the lower fourbar tops 120 rotate about pivot 124 in the lower corner assembly and pull downward on the foot linkages 345, bottom bearings 350, and leg rods 355. The tops of the upper bearings 360 are connected to cables 420 that pass into the portions 110A, 110B of each cross bar 110 through passageways 425 in the upper corner linkage cover 115 as illustrated in FIG. 11B, with upper corner linkage cover 115 removed. The cables 420 pull the plungers 405 out of engagement with the strike plate 415 as illustrated in FIG. 11C. This unlocks the two portions 110A, 110B of each cross bar 110 and allows the two portions 110A, 110B to rotate relative to one another and fold as illustrated in FIGS. 4A and 4B. Further details of the routing of the cables 420 is illustrated in FIG. 11D with the upper corner linkage cover 115 removed.

Figure 11D:
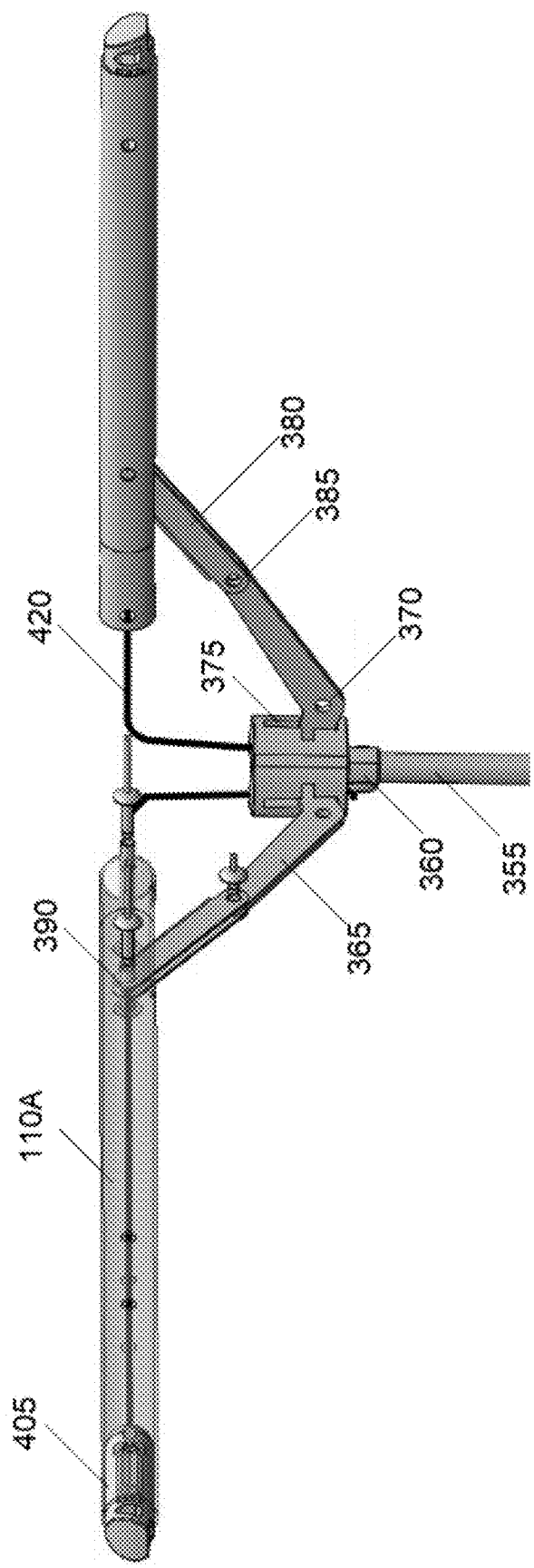
FIG. 11D illustrates details of routing of cables into the upper cross bars of a play yard for use in unlocking the upper cross bars.

As also illustrated in FIG. 11D, as the frame 100 of the play yard 10 folds, the upper bearings 360 push upward on inner ends of linkages 365, which cause the linages 365 to rotate about pivot points 370 and for the inner sides of the linkages 365 to raise up through slots 375. The outer ends of the linkages 365 pull down on linkages 380 through pivot point 385. The ends of linkages 380 opposite the pivot point 385 are pivotally connected to the portions 110A of cross bars 110 at pivot points 390 and pull the cross bars 110 down as linkages 380 are rotated about pivot point 385 by pressure from linkages 365.

To return the frame 100 from a folded configuration to an open locked configuration, one presses downward on the top of the hub 135. This causes the cross bars 110, the lower fourbar tops 120, and the lower fourbar bottoms 125 to rotate about their respective pivots and unfold. Further downward pressure one the hub 135 brings the hub 135 to its lower position in the frame as illustrated in FIGS. 1-3. The lower fourbar tops 120 relax their pull on foot linkages 345, bottom bearings 350, leg rods 355, and upper bearings 360, giving the cables 420 sufficient slack to provide for the springs 410 in the cross bars 110 to push the plungers 405 back into engagement with the surfaces 415A, 415B of the strike plates 415 to lock the cross bar portions 110A, 110B in place relative to one another. The hub mechanical spindle 220 is forced downward through the column 340 and hub mechanical central tube 215 until the lower end portion 235 of the hub mechanical spindle 220 reaches its lower position illustrated in FIG. 5 and pushes against the lower internal walls 240A of the hub lock fingers 240 to push the feet portions 250 of the hub lock fingers 240 into their locked position outside of the lower opening 215A of the hub mechanical central tube 215.

Having thus described several aspects of at least one embodiment of this disclosure, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A child play yard including a frame comprising:
legs;
lower cross bars having first ends pivotally coupled to lower ends of the legs;
a hub pivotally coupled to second ends of the lower cross bars, the hub including a hub mechanical central tube, a column slidably disposed within the hub mechanical central tube, a hub mechanical spindle disposed within the column, and hub lock fingers pivotally coupled to a lower portion of the column and including lower feet portions, the hub mechanical spindle having an enlarged diameter lower end portion that engages lower inner sidewalls of the hub lock fingers and maintains the lower feet portions of the hub lock fingers outside a perimeter of a lower opening of the hub mechanical central tube when the hub is disposed in a lowermost position in the frame; and
a hub cover and a middle central piece slidably disposed within a recess defined in the hub cover, an upper end of the hub mechanical spindle being secured to the middle central piece, mechanical stops extending from a lower surface of the middle central piece that limit relative displacement between the hub cover and middle central piece.

2. The child play yard of claim 1, wherein the enlarged diameter lower end portion of the hub mechanical spindle engages internal angled sidewalls of the hub lock fingers and displaces the lower feet portions of the hub lock fingers to a position below and within the perimeter of the lower opening of the hub mechanical central tube when the hub is displaced a first distance above the lowermost position in the frame.

3. The child play yard of claim 2, wherein the column is displaced upward through the hub mechanical central tube when the hub is displaced the first distance above the lowermost position in the frame.

4. The child play yard of claim 3, wherein the column is displaced further upward through the hub mechanical central tube and the hub lock fingers are drawn into the hub mechanical central tube when the hub is displaced a second distance greater than the first distance above the lowermost position in the frame.

5. The child play yard of claim 1, wherein the lower cross bars include lower fourbar tops and lower fourbar bottoms.

6. The child play yard of claim 5, wherein the hub further includes a base, second ends of the lower fourbar bottoms being pivotally coupled to the hub with pivot pins fixedly coupled to lower internal walls of the base of the hub.

7. The child play yard of claim 6, wherein the hub further includes linkage interfaces disposed within the base, second ends of the lower fourbar tops being pivotally coupled to the hub with first pivot pins fixedly secured to upper internal walls of the base of the hub and by second pins that slide through slots defined in the linkage interfaces.

8. The child play yard of claim 7, further comprising upper cross bars extending between respective pairs of the legs, the upper cross bars including first portions and second portions, the first and second portions being locked in alignment with one another when the hub is disposed in the lowermost position in the frame.

9. The child play yard of claim 8, wherein the first and second portions are locked in alignment with one another when the hub is disposed in the lowermost position in the frame by plungers internal to the first and second portions that are biased by springs into contact with surfaces of strike plates disposed between ends of the first and second portions.

10. The child play yard of claim 9, wherein displacement of the hub to a position above the lowermost position in the frame causes the first ends of the lower fourbar tops to pull on foot linkages disposed on lower portions of the legs that in turn pull indirectly on cables that pass into the first and second portions of each upper cross bar and pull the plungers out of engagement with the strike plates.

11. The child play yard of claim 1, further comprising a spring disposed about an upper portion of the hub mechanical spindle and biasing the hub mechanical spindle downward through the column.

12. The child play yard of claim 1, wherein an upper end of the column is secured to a bottom surface of the hub cover.

13. A child play yard including a frame comprising:
legs;
lower cross bars having first ends pivotally coupled to lower ends of the legs and second ends pivotally coupled to a hub disposed substantially centrally within a periphery of the frame, the hub including hub lock fingers pivotally coupled to the hub and including lower feet portions, and a hub mechanical spindle having an enlarged diameter lower end portion that engages lower inner sidewalls of the hub lock fingers and maintains the lower feet portions of the hub lock fingers outside a perimeter of a lower opening of the hub when the hub is disposed in a lowermost position in the frame;
upper cross bars extending between respective pairs of the legs, the upper cross bars including first and second sections with ends disposed proximate midpoints of the upper cross bars, the first and second sections being locked into alignment with one another when the hub is disposed in the lowermost position; and
a hub cover and a middle central piece slidably disposed within a recess defined in the hub cover, an upper end of the hub mechanical spindle being secured to the middle central piece, mechanical stops extending from a lower surface of the middle central piece that limit relative displacement between the hub cover and middle central piece,
displacement of the hub upward from the lowermost position causing the hub mechanical spindle to engage internal angled sidewalls of the hub lock fingers and cause the hub lock fingers to pivot and the lower feet portions to be drawn into the lower opening of the hub, the lower cross bars to pivot relative to the hub and the legs and to draw the legs inward toward the hub, the first ends of the lower cross bars to pull indirectly on cables passing into the upper cross bars, the cables disengaging plungers from strike plates in the upper cross bars and unlocking the first and second sections of the upper cross bars from each other, and the upper cross bars to fold and the ends of the first and second sections of the upper cross bars to be drawn downward.

14. The child play yard of claim 13, wherein the hub further comprises a hub mechanical central tube, a column slidably disposed within the hub mechanical central tube, the hub mechanical spindle disposed within the column, the hub lock fingers pivotally coupled to a lower portion of the column, the displacement of the hub upward from the lowermost position further causing the column to be displaced upward through the hub mechanical central tube.

15. The child play yard of claim 13, further comprising a linkage interface to which the second ends of the lower cross bars are pivotally coupled, the displacement of the hub upward from the lowermost position further causing the linkage interface to be displaced upward through the hub.

* * * * *